July 24, 1928. 1,678,206

M. E. BENESH

OILER

Filed Feb. 28, 1927

INVENTOR.

Matthew E. Benesh,

BY

Hood + Hahn.

ATTORNEYS

Patented July 24, 1928.

1,678,206

UNITED STATES PATENT OFFICE.

MATTHEW E. BENESH, OF CICERO, ILLINOIS, ASSIGNOR TO THE CONNERSVILLE BLOWER CO., OF CONNERSVILLE, INDIANA, A CORPORATION OF INDIANA.

OILER.

Application filed February 28, 1927. Serial No. 171,590.

In that type of gas meter which has recently come into use, in which measuring pockets are formed between a casing and the co-acting lobes of two rotary lobed elements, commonly called "impellers", difficulty has been experienced in adequately lubricating such "impellers".

The object of my present invention is to provide means for accomplishing such lubrication and for convenience I shall continue to designate the lobed elements as "impellers" although, as a matter of fact, such elements are rotated by the differential pressure of the gas acting thereon and therefore actually perform no impeller function.

Figure 1:
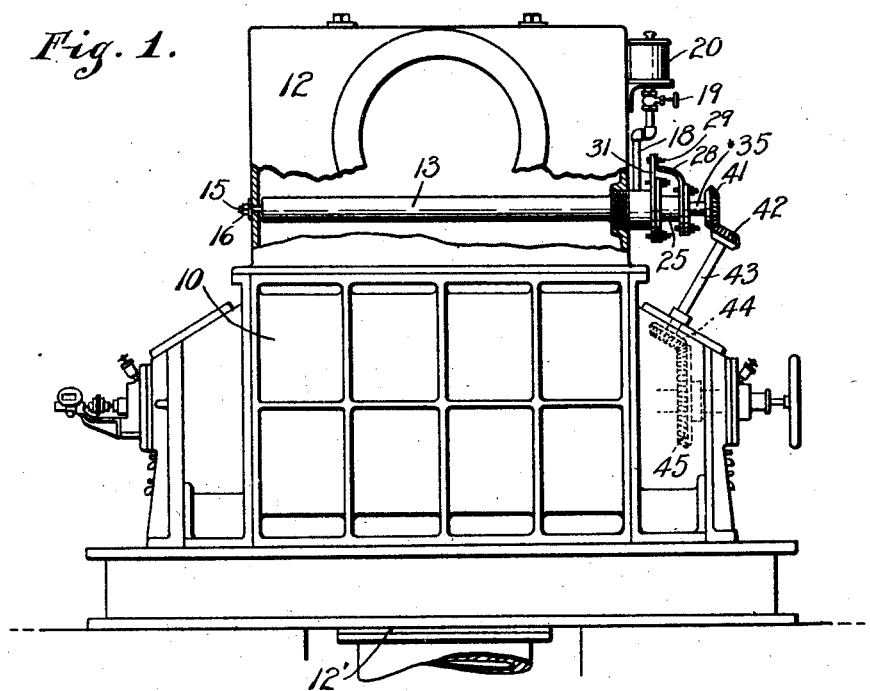

The accompanying drawings illustrate my invention:

Fig. 1, is a side elevation in partial vertical section of a meter equipped with my improvement, the oiling device being relatively exaggerated for ease in illustration.

Figure 2:
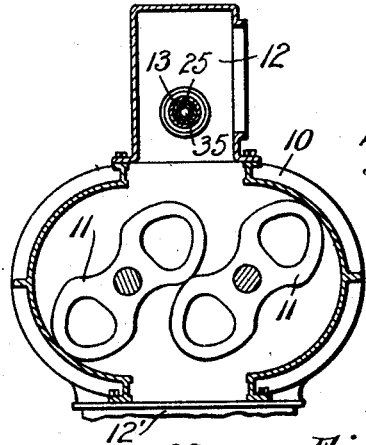

Fig. 2, a transverse section on a smaller scale.

Figures 3, 6, 7:
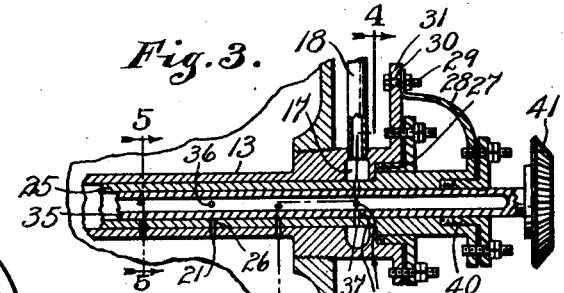

Fig. 3, a fragmentary axial section of a portion of the oiler.

Figures 4, 5:
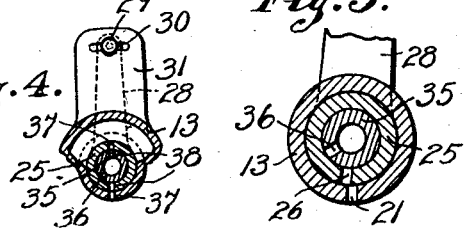

Fig. 4, a section on line 4—4 of Fig. 3.

Fig. 5, a section on line 5—5 of Fig. 3 on a slightly larger scale.

Fig. 6, a fragmentary perspective of the rotary element of the oiler and

Fig. 7, a fragmentary sectional detail of the anchored end of the oiler.

In the drawings 10 indicates the casing, 11—11 the lobed impellers, 12 the inlet box, and 12' the outlet box of a meter of the type under consideration.

Projected into the inlet box, preferably medially above the impellers 11, is a tube 13 closed at its far end by plug 14 and anchored in the casing by a threaded pin 15 and nut 16. At the receiving end of tube 13 is an annular chamber 17 into which leads an oil supply pipe 18 provided with a valve 19 and connected to the supply chamber 20. Tube 13 along its bottom is provided with a plurality of discharge openings 21 which are made sufficiently large to eliminate all reasonable possibility of clogging.

Journaled in tube 13 is a tube 25 provided with a longitudinal series of holes 26 in size and arrangement corresponding with hole 21. At its outer end tube 25 passes through a stuffing box 27 formed in the outer end of tube 13 beyond chamber 17 and is provided with a finger 28 having a clamping bolt 29 passing through a slot 30 in an arm 31 carried by tube 13, the arrangement being such that tube 25 may be annularly adjusted within tube 13 to vary the extent of registry of holes 26 with holes 21.

Journaled within tube 25 is a tube 35 provided with a spirally arranged series of openings 36 in longitudinal arrangement corresponding with the longitudinal arrangement of holes 26.

An annular series of holes 37 through the wall of tube 25 and a corresponding annular series of holes 38 through the wall of tube 35 forms constant communication between chamber 17 and the interior of tube 35.

Tube 35 passes through a stuffing box 40 in the outer end of tube 25, and is provided with a gear 41 meshing with the gear 42 carried by a shaft 43 journaled in a suitable bearing in the meter frame 10 and provided at its inner end with a gear 44 meshing with gear 45 on a shaft of one of the impellers 11. The holes 21, 26 and 36 are made much larger than would be necessary to transmit an adequate quantity of oil to the impellers in order to avoid all possible danger of becoming clogged either by impurities in the oil or by accumulation of condensables from the gas being metered or reaction between the lubricant and the gas so that, intermittently, tube 25 may be rotated in tube 13 to bring holes 26 into full registry with holes 21, thus permitting the holes to be flushed out under pressure. Normally tube 25 will be angularly adjusted within tube 13 so as to reduce the possible flow from tube 35 and, as the impellers rotate under the action of the gas differential, sufficient lubrication will be delivered to the surfaces of the impellers.

I claim as my invention:

1. A lubricator comprising, an outer tube provided with discharge openings through its wall, an intermediate adjustable tube mounted in the outer tube and having through its wall a series of openings adjustably registrable to various extents with the openings through the outer tube, means for holding said intermediate tube in various adjusted positions, an inner tube journaled within the intermediate tube and having openings formed through its wall, registrable with the openings through the intermediate tube, means by which said inner tube may be rotated, and a supply line delivering into the interior of the inner tube.

2. A lubricator comprising, an outer tube having an annular feed chamber and a plurality of longitudinally spaced discharge openings formed through its wall, a feed line leading to said annular chamber, an intermediate tube adjustably mounted in the outer tube and having a series of holes through its wall adjustably registrable to various extents with the holes in the outer tube and also having a communication between its interior and the annular chamber of the outer tube, means for holding said intermediate tube in various adjusted positions, an inner tube rotatably mounted within the intermediate tube, the wall of said inner tube being pierced to register with the openings through the intermediate tube, and means by which the inner tube may be rotated.

3. In a gas meter comprising a main casing and a pair of rotary lobed impellers mounted therein, a lubricator for said impellers comprising an outer tube arranged above and extending longitudinally of the impellers and provided with discharge openings through its wall in such position that the lubricant will pass therefrom to the impellers, an intermediate adjustable tube mounted in the outer tube and having through its wall a series of openings adjustably registrable to various extents with the openings through the outer tube, means for holding said intermediate tube in various adjusted positions, an inner tube journaled within the intermediate tube and having openings formed through its wall registrable with the openings through the intermediate tube, means by which said inner tube may be rotated, and a supply line delivering into the interior of the inner tube.

4. In a gas meter comprising a main casing and a pair of mating rotary lobed impellers mounted therein, a lubricator for said impellers comprising an outer tube arranged above and extending longitudinally of the impellers and having an annular feed chamber and a plurality of longitudinally spaced discharge openings formed through its wall to deliver a lubricant to the impellers, a feed line leading to said annular chamber, an intermediate tube adjustably mounted in the outer tube and having a series of holes through its wall adjustably registrable to various extents with the holes in the outer tube and also having a communication between its interior and the annular chamber of the outer tube, means for holding said intermediate tube in various adjusted positions, an inner tube rotatably mounted within the intermediate tube, the wall of said inner tube being pierced to register with the openings through the intermediate tube, and means by which the inner tube may be rotated.

In witness whereof, I have hereunto set my hand at Indianapolis, Indiana, this 25th day of February, A. D. one thousand nine hundred and twenty-seven.

MATTHEW E. BENESH.